United States Patent [19]

Chartet

[11] 3,894,580

[45] July 15, 1975

[54] TIE FOR CONNECTING TOGETHER LATERAL PLATES END PLATES AND HEADER BOXES OF RADIATORS

[76] Inventor: Andre Chartet, 2 bis, Aveneue du Chateau, 92-Meudon, France

[22] Filed: July 25, 1973

[21] Appl. No.: 382,531

[30] Foreign Application Priority Data
Aug. 4, 1972 France .............................. 72.28352

[52] U.S. Cl. ...................... 165/67; 29/464; 29/466; 248/68 R; 180/68; 24/81 B
[51] Int. Cl. .............................. F28f 9/00; F28f 9/12
[58] Field of Search ................ 165/41, 67, 149–153; 24/73 B, 81 B; 180/68 R, 68 P, 68; 248/49, 68; 29/464.6

[56] References Cited
UNITED STATES PATENTS

| | | | |
|---|---|---|---|
| 2,231,153 | 2/1941 | Camiener | 24/73 B |
| 3,392,779 | 7/1968 | Tilbrook | 165/67 X |

FOREIGN PATENTS OR APPLICATIONS

| | | | |
|---|---|---|---|
| 481,573 | 1/1938 | United Kingdom | 24/73 B |

Primary Examiner—Charles J. Myhre
Assistant Examiner—Theophil W. Streule, Jr.

[57] ABSTRACT

The radiator comprises tubes 1 separated by flow disturbers 2 to constitute a core laterally held by two plates 3 connected by means of ties 4 whose ends form clamps 6 engaged into apertures 5 made in the sides of the plates.

11 Claims, 11 Drawing Figures

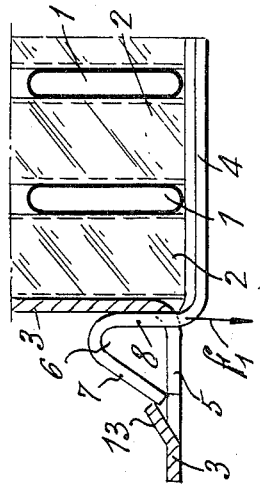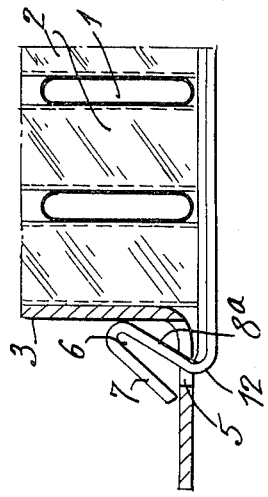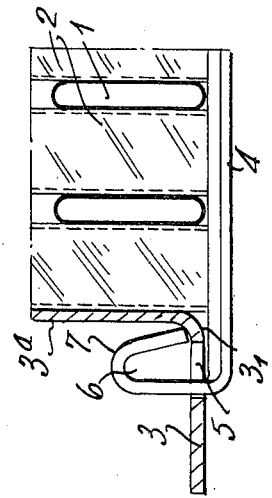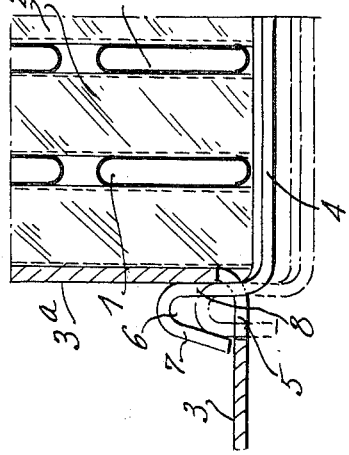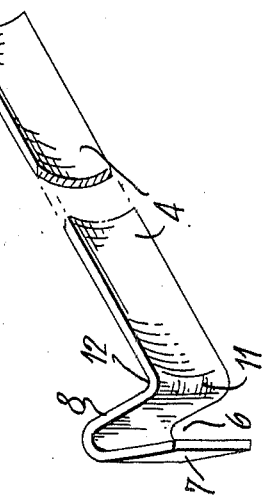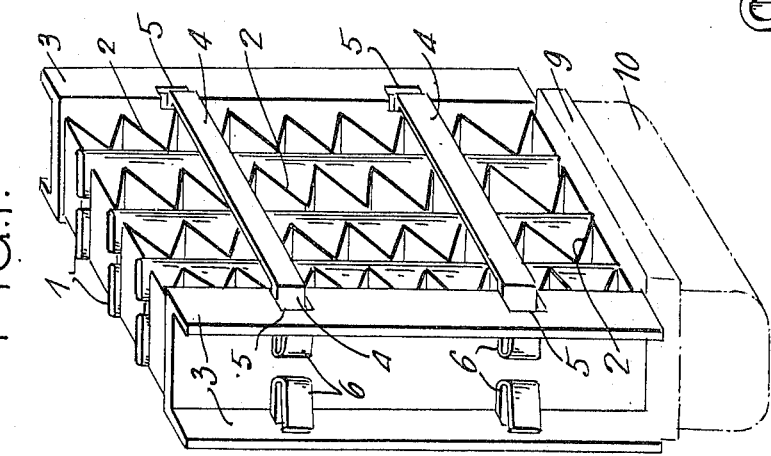

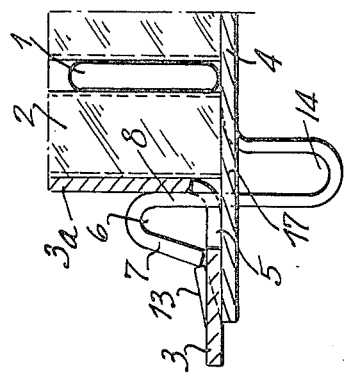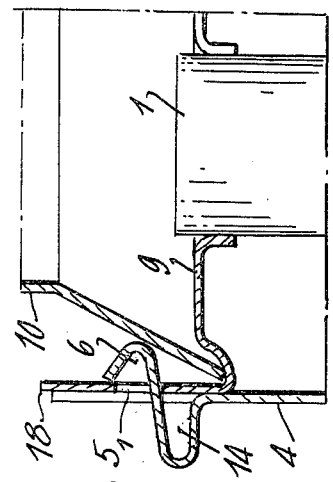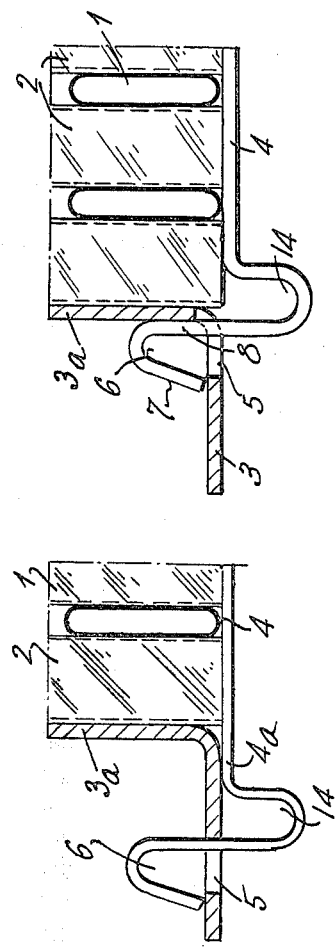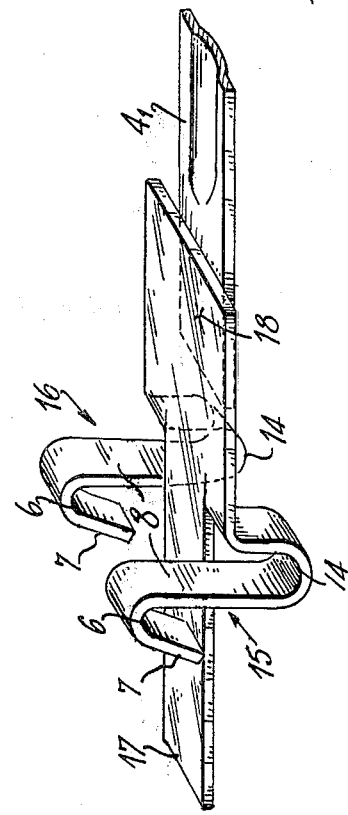

TIE FOR CONNECTING TOGETHER LATERAL PLATES END PLATES AND HEADER BOXES OF RADIATORS

In radiators and other heat exchangers using circulation tubes connected together by flow disturbers constituted in the form of currugated strips, it is necessary to design lateral plates holding under a slight pressure said disturbers and said group of tubes in view of, first, preventing said tubes and disturbers respectively from being set off before performance of the welding or brazing operation which is provided at the end of the manufacturing process, to connect them in a final way, and in view further that the inner pressure to which the tubes can furtherly be submitted upon utilization of the radiator will not make them inflate or burst.

For that purpose, it has already been proposed to connect the lateral plates by means of ties, the ends thereof being welded to said lateral plates by means of electrical welds.

In the radiator cores wherein the tubes are engaged into end plates, then covered by header boxes, it is also important that the end plates be arranged in a quite definite way and that the distance between them be maintained constant up to the moment where said end plates are welded or brazed to the end of the tubes.

Practically, the maintaining at some distance of the end plates is obtained by connecting them to the ends of the lateral plates through electrical welding points.

The present invention relates to a new tie which ensures connection of the lateral plates of the radiator cores in the very well known and above explained way, but without having to make any electrical weld and without either having to design any tooling for assembling the ties with said lateral plates.

Besides, the tie of the present invention, also provides to connect the end plates and even if so required the header boxes covering said end plates, while eliminating operations of crimping or of folding lugs to maintain said header boxes in place in the end plates.

According to the invention, the tie is constituted in the shape of an elongated element having ends which are folded back to delimit at least one shackle forming a protruding strap, said shackle being engaged into an aperture selectively provided in the lateral plate, the end plate, and the header box, said aperture having a width smaller than that of the protruding end of the protruding strap of said shackle which then constitutes a retaining clip.

The tie of the invention is usable irrespective of the metals or alloys used to manufacture the radiator parts and enables, if so required, in an additional embodiment of the invention, to compensate for the differential heat expansions which can exist between said tie and the remaining parts of the radiator, said heat differential expansions being produced when the radiator is heated to be welded or brazed.

Various other characteristics of the invention are moreover shown in the following detailed description.

Embodiments of the invention are shown by way of non-restrictive examples in the accompanying drawings.

FIG. 1 is a diagrammatic perspective view of a radiator core embodying the invention.

FIG. 2 is an enlarged explaining sectional view of a portion of FIG. 1.

FIG. 3 is a perspective view illustrating additional characteristics of the invention.

FIGS. 4–8 are elevational sectional views, similar to FIG. 2, showing different variants.

FIG. 9 is a perspective view of a portion of FIG. 8.

FIG. 10 is a top elevational sectional view showing another application of the invention.

FIG. 1 shows a radiator core comprising tubes 1 between which are placed corrugated flow disturbers 2 tightened against the wall of the tubes 1 by lateral channel plates 3 which, in the example represented, have substantially a U-shaped cross-section.

To keep the lateral channel plates 3 in a correct position by which they hold the fins or disturbers 2 against the tubes, both during the welding or brazing of the radiator as well as during the further utilization thereof, said lateral plates are connected through transverve ties 4, the number of which depend principally on the size of the radiator. The lateral plates have, in the lateral sides thereof, apertures 5 better seen in FIG. 2 and the ties 4 are shaped, at their two ends, to delimit, at each time, a shackle 6 the end 7 of which is widened and is distant from the folded back portion shown in 8 by a distance which is greater than the width of each aperture 5.

Thus, and as is better shown in FIG. 2 when the radiator core has been prepared, i.e. after having placed the disturbers 2 on both sides of the tubes and placed the lateral plates 3, the only operation which has to be done is to engage the shackles 6 of the ties into the apertures 5. Said shackles being engaged in a way similar to snap-fasteners cannot be removed, since the protruding end 7 bears, beyond the aperture 5, against the wall of the corresponding plate.

When care has been taken to correctly surface and smooth the core before placing the ties 4, the parts constituting said core are held in suitable position during the next working processes, i.e. the steps of placing the end plates 9 on the ends of the tubes, then placing the header boxes 10 and then welding or brazing the assembled radiator.

Then, when the radiator is used, for example in a vehicle, the ties 4, which have been welded or brazed to the plates, are still constituting means holding the radiator core in correct position and thus able to compensate for the stresses tending to inflate the tubes 1 when the fluid running through them is under pressure.

FIG. 2 shows that it is often advantageous that the folded back portion 8 constituting the beginning of each shackle 6 be applied against the bottom 3a of the corresponding lateral plate 3, thus said portion 8 is welded or brazed to the lateral plate, which provides that the tie 4 substantially works on pulling without any risk to bending at its ends.

The ties 4 and the shackles 6 thereof can be made from metallic wires or, as represented in FIG. 3, from narrow and thin bands. In such a case, it is advantageous, as represented in said FIG. 3 that the tie be curved in its transverse direction to increase the rigidity thereof.

Also it is advantageous to form a stamping 11 at the level of the fold 12 delimiting the folded back portion 8 to provide a great rigidity to said folded back portion while avoiding that such fold forms a hinge.

FIG. 4 shows a development of the invention wherein protuberances 13 are formed in the sides of the lateral plates 3, at the level of the apertures 5, said protuberances 13 being for example stampings or a small lug as represented and having a width smaller than the width of the aperture 5. Thus when the shackle 6 has been placed, its end 7 bears against the protuberance 13 thus preventing any deformation of the shackle 6 in case a stress according to arrow $f_1$ would be applied on the tie 4.

The above described ties can be made of a metal different from that of the constituting parts of the radiator, especially when said radiator is made of copper or ferrous metals. Actually, the differential expansions which can then exist between the ties and the constituting parts of the radiator are small and there is no risk of crushing the tubes at the moment of welding the radiators.

When the radiator core is made of aluminum alloys and when the constituting parts are joined through brazing, the ties are preferably made also of aluminum alloy when it is required to eliminate the influence of the differential expansions. Yet, it can occur, in some manufacturing processes, especially in order that the ties will show a great strength, that they are made of a metal other than an aluminium alloy, for example made of steel or of stainless steel and in such a case, differential expansions between the ties and the radiator parts have to be taken into consideration.

FIG. 5 shows a first embodiment wherein the folded back portion 8a forms a sharp angle with the tie, thus the shackle 6 is bearing against the bottom of the plate 3 only through its bent end. In such a way the fold 12 which preferably does not have any longer the stamping 11, cooperates with the folded portion 8a to form a spring, compensating thereby the differential expansions during the brazing process.

According to the variant of FIG. 6, the folded back end 7 of the shackle 6 is turned towards the bottom 3a of the lateral plate 3 and, in such a case, the aperture 5 is formed to leave a shoulder 3 at each end of said bottom 3a, so that the end 7 of the shackle bears on this shoulder. Then the shackle 6 forms a resilient element to compensate the differential expansions and the shoulder $3_1$ of the lateral plate has the function of the protuberance 13 shown in FIG. 4.

FIG. 7 shows a variant wherein the shackle 6 is formed as in FIG. 2, thus the portion 8 described in reference with said FIG. 2 bears against the bottom 3a of the lateral plate 3. In addition, said portion 8 is extended to delimit an auxiliary shackle 14 opposite to the shackle 6. Consequently it is to be noticed that in this embodiment, it is the shackle 14 which is the compensating element for the differential expansions between the tie 4 and the parts constituting the radiator. When the radiator is, in the end, welded or brazed, the portion 8 is rigidly connected to the bottom of the lateral plate in the same way as in FIG. 2.

FIG. 7a shows a very slight variant wherein the aperture 5, instead of being formed in the immediate vicinity of the bottom 3a of the lateral plate, is made in the side of the same at some distance from said bottom 3a. By forming the tie exactly as in FIG. 7, the tie ensures tightening of the lateral plates on the disturbers and on the tubes to maintain the same held together, and the end 4a of the tie 4 is moreover made to bear against the side of the plate. Thus, the auxiliary shackle 14 compensates for the differential expansions which can exist and after performance of the welding or brazing operation, the end 4a of the tie is welded or brazed to the lateral plate, destroying thereby the effect of the auxiliary shackle 14 which is no more of any use when the brazing or the welding operation has been made.

FIGS. 8 and 9 show another embodiment wherein the shackle 6, as well as the auxiliary shackle 14 are formed from one or two straps 15, 16 (FIG. 9) cut in the band forming the tie 4 while leaving a small tongue 17 free between these two straps, which is thus applied against the outer side of the lateral plate when said shackle 6 of each strap 15 and 16 is engaged into the aperture 5. The small tongue 17 forms a spring and maintains the end 7 of each shackle 6 against the inner wall of the lateral plate. Besides, during the welding or brazing process, the auxiliary shackle 14 of each strap compensates for the differential expansions while the portion 8 is held against the bottom 3a when there is a protuberance 13 forming a stop for said end 7. When brazing is completed, the portion 8 is brazed with the bottom 3a of the lateral plates and, in addition the small tongue 17 is brazed to the side of said lateral plate; effect of the auxiliary shackle 14 is thereby destroyed.

When it is desired that the tie 4 have only a small width in order not to reduce in an important way the useful front surface of the radiator core, it is possible to constitute the ends forming the shackles in the form of small clips, as shown in FIG. 9, and to connect two clips by a rod or a connecting strip $4_1$ forming the tie, said connecting rod being fixed for example by means of electrical welding points 18.

This latter arrangement makes possible, when so required, to make the rod or connecting strip $4_1$ of a metal different from that of the so-called clip. For example the clip can be made of aluminum, brass, etc... and the rod or strip $4_1$ made of stainless steel or the like, etc... depending on the nature of the metal or of the alloy constituting the other portions of the radiator.

In the above disclosure, the tie is described in its application to the connection of the lateral plates of a radiator. Said application is not the only one which can be made and FIG. 10 shows that the tie can also be utilized to connect the two end plates 9 placed on the ends of tubes 1. In such a case the lugs 18 are designed, for example on the large sides of the end plate, and in said lugs are made apertures $5_1$ for engagement of the shackles 6 which can be made according to one of the above described embodiments. When an auxiliary shackle 14 is designed, as in the embodiments shown in FIGS. 7, 8 and 9, then the differential expansion which can exist between the tubes, the plates and the ties 4 are compensated by said auxiliary shackles.

The invention is not restricted to the embodiments shown and described in detail, for various modifications can moreover be applied thereto without departing from the scope of the invention. Especially the same radiator can comprise at the same time one or several ties connecting its lateral plates and one or several ties connecting its end plates. It is also possible, though it has not been represented, to design a tie to connect added lugs on the header boxes 10 which ensures in such a case a correct holding of said header boxes in the end plates before the welding or brazing processing of the radiator assembly. Also a single tie can have two different shackles on each of the ends thereof, for example a shackle as described with reference to FIG. 4 at one end and a shackle as described with reference to FIG. 7 or to FIG. 8 at the other end. One end of each tie can also form a simple hook.

I claim:

1. In a heat exchanger assembly comprising a plurality of heat exchange fluid conducting fins and conduits, end plates for spacing said conduits, and vertical lateral channel plates having flanges facing outwardly for laterally holding said conduits, the improvement comprising:

means for tying said lateral channel plates together, said tying means comprising a plurality of shackle elements and plurality of cooperative apertures in the flange of said lateral channel plates, each said shackle element being in cooperative engagement with said flange and disposed therewithin, and with a said cooperative aperture, each said shackle element comprising an aperture engaging portion of strip material folded back to define a generally U-shaped retaining clip, the ends of said "U" being spaced apart a distance greater than the width of said aperture.

2. A heat exchanger in accordance with claim 1, wherein said tying means comprises an elongated strap having said shackle element at each end thereof.

3. A heat exchanger in accordance with claim 1, wherein said shackle elements are disposed on opposite ends of said end plates.

4. A heat exchanger in accordance with claim 1, wherein each flange of said lateral channel plate has a protuberance adjacent said aperture, and the free end of said U-shaped clip engages said protuberance.

5. A heat exchanger in accordance with claim 2, wherein said elongated strap is curved in the transversal direction.

6. A heat exchanger in accordance with claim 2, wherein said U-shaped clip has one leg thereof forming an acute angle with said strap, whereby, the U-shaped portion of said shackle bears against the flange of said lateral plate.

7. A heat exchanger in accordance with claim 1, wherein the free end of said U-shaped clip bears aginst the flange of said lateral channel plate.

8. A heat exchanger in accordance with claim 2, wherein tying means further comprises means to compensate for differential expansions, said compensative means comprising a bent portion between said strap and said shackle element.

9. A heat exchanger according to claim 8, wherein said apertures in the flanges of said lateral channel plates are spaced from the edges of said lateral channel plates.

10. A heat exchanger according to claim 8, wherein said tying means further comprises a small tongue extending from and in the same direction of and coplanar with said elongated strap, said tongue bearing against the outer side of the flange of said lateral channel plate when the free end of said shackle bears against the inner wall of the flange of said lateral channel plate.

11. A heat exchanger according to claim 2, wherein said elongated strap is partly constructed of a metal different from that constituting the parts of the radiator.

* * * * *

UNITED STATES PATENT AND TRADEMARK OFFICE
CERTIFICATE OF CORRECTION

PATENT NO. : 3,894,580
DATED : July 15, 1975
INVENTOR(S) : Andre Chartet

It is certified that error appears in the above-identified patent and that said Letters Patent are hereby corrected as shown below:

Title page, between [76] and [22], insert

[73] Assignee: Societe Anonyme Des Usines Chausson, Asnieres (Hauts-de-Seine) France Signed and Sealed this Tenth Day of August 1976

[SEAL]

Attest:

RUTH C. MASON
*Attesting Officer*

C. MARSHALL DANN
*Commissioner of Patents and Trademarks*